United States Patent
Chen et al.

(10) Patent No.: US 9,723,563 B1
(45) Date of Patent: Aug. 1, 2017

(54) DEVICE AND A METHOD OF WAKING UP THE SAME

(71) Applicant: HIMAX TECHNOLOGIES LIMITED, Tainan (TW)

(72) Inventors: Shing-Chia Chen, Tainan (TW); Yi-Long Yang, Tainan (TW); Yaw-Guang Chang, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 15/080,174

(22) Filed: Mar. 24, 2016

(51) Int. Cl.
*H04W 52/02* (2009.01)
*H04W 12/06* (2009.01)
*H04M 1/725* (2006.01)
*G06F 21/31* (2013.01)
*G06K 9/00* (2006.01)
*H04W 88/02* (2009.01)

(52) U.S. Cl.
CPC ... *H04W 52/0254* (2013.01); *H04M 1/72569* (2013.01); *H04M 1/72577* (2013.01); *H04W 12/06* (2013.01); *G06F 21/31* (2013.01); *G06K 9/00067* (2013.01); *G06K 9/00087* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 7,738,678 B2 | 6/2010 | Breed et al. | |
| 8,885,895 B2 | 11/2014 | Morioka et al. | |
| 2004/0125993 A1* | 7/2004 | Zhao | G06K 9/00006 382/124 |
| 2004/0218790 A1* | 11/2004 | Ping Lo | G06K 9/00067 382/124 |
| 2006/0153433 A1* | 7/2006 | Lo | G11B 20/00086 382/124 |
| 2015/0021465 A1 | 1/2015 | Gettings et al. | |
| 2016/0026841 A1* | 1/2016 | Merrell | G06K 9/0002 382/124 |

FOREIGN PATENT DOCUMENTS

TW    201426545 A    7/2014

OTHER PUBLICATIONS

Office Action Dated Jan. 3, 2017 in corresponding Taiwan Patent Application No. 105109424.

* cited by examiner

*Primary Examiner* — Olumide T Ajibade Akonai
*Assistant Examiner* — Margaret G Mastrondonato
(74) *Attorney, Agent, or Firm* — Donald E. Stout; Stout, Uxa & Buyan, LLP

(57) ABSTRACT

A method of waking up a device includes capturing an image by scanning a fingerprint pattern in a sleep mode; analyzing the captured image representing the scanned fingerprint pattern to obtain an amount of pixels in the captured image with respect to each brightness value; transforming the analyzed captured image into brightness distribution; operating the brightness distribution to obtain a feature value; and comparing the feature value with a pre-stored value, the device being woken up when the feature value is matched with the pre-stored value.

14 Claims, 5 Drawing Sheets

DEVICE AND A METHOD OF WAKING UP THE SAME

BACKGROUND OF THE INVENTION

1. Field of the Invention

The present invention generally relates to fingerprint authentication, and more particularly to a method of fast activating a mobile device from a sleep mode based on fingerprint authentication.

2. Description of Related Art

A fingerprint sensor has been commonly used in a mobile device such as a mobile phone to capture a digital image of a fingerprint pattern. The captured digital image is then processed to create a biometric template (also known as a golden template) that is stored and used for matching. Accordingly, individuals operating the mobile device may be identified and their identity or access approval be verified. Compared with conventional user authentication schemes using passwords, the fingerprint authentication provides more convenient and faster means.

Due to limited and precious battery power of the mobile devices, sleep mode is adopted to save significantly on power consumption, in stead of leaving the mobile devices fully on all the time. When resumed (i.e., wake up), the operation of the mobile devices continues from the same point it leaves.

However, conventional mobile devices equipped with fingerprint authentication suffer slowness and power waste when resuming from a sleep mode, owing to time-consuming matching between a captured fingerprint image and a fingerprint golden template. Therefore, a need has thus arisen to propose a novel method and device of activating a mobile device from a sleep mode in a fast manner.

SUMMARY OF THE INVENTION

In view of the foregoing, it is an object of the embodiment of the present invention to provide a method and device of fast activating a mobile device from a sleep mode based on fingerprint authentication to reduce power consumption.

According to one embodiment, an image is captured by scanning a fingerprint pattern in a sleep mode. The captured image representing the scanned fingerprint pattern is analyzed to obtain an amount of pixels in the captured image with respect to each brightness value; and the analyzed captured image is transformed into brightness distribution. The brightness distribution is operated to obtain a feature value, and the feature value is compared with a pre-stored value, the device being woken up when the feature value is matched with the pre-stored value.

According to another embodiment, a device includes a host processor, a fingerprint sensor and a local controller. The host processor controls at least one component of the device. The fingerprint sensor is associated with and disposed at a scan area, and the local controller commands the fingerprint sensor. The host processor communicates with the local controller in an operating mode, and is separate from the local controller in a sleep mode. The fingerprint sensor captures an image under control of the local controller by scanning a fingerprint pattern in the sleep mode; the captured image is analyzed to obtain an amount of pixels in the captured image with respect to each brightness value, which is then transformed into brightness distribution by the local controller, from which a feature value is obtained; and the local controller notifies the host processor to wake up when the feature value is matched with a pre-stored value.

DETAILED DESCRIPTION OF THE INVENTION

Figure 1:
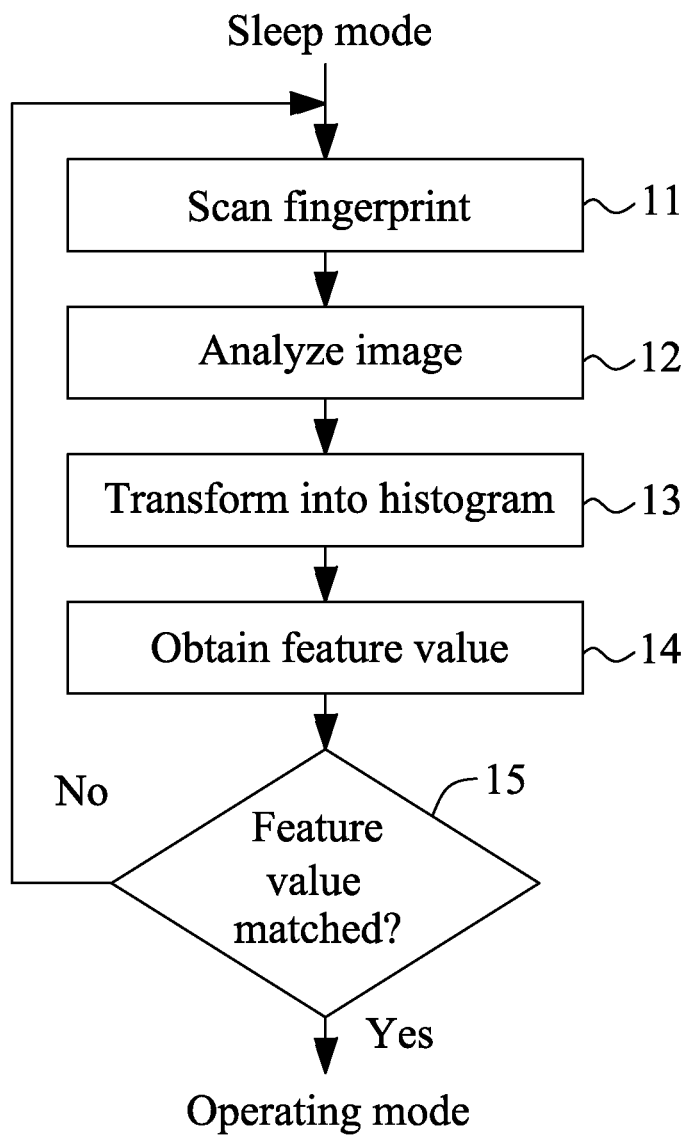
FIG. 1 shows a flow diagram illustrating a method of activating a mobile device from a sleep mode to an operating mode based on fingerprint authentication according to one embodiment of the present invention.

FIG. 1 shows a flow diagram illustrating a method 100 of activating a mobile device from a sleep mode to an operating mode based on fingerprint authentication according to one embodiment of the present invention. The mobile device of the embodiment may, but not necessarily, be a mobile phone. As exemplified in a perspective view of FIG. 2A, the mobile device 20 may include at least a touch screen 201 and a scan area 202 associatively equipped with a fingerprint sensor. The technologies adopted to implement the fingerprint sensor of the embodiment may include, but not limited to, capacitive, optical, radio frequency (RF), thermal, resistive, ultrasonic, piezoelectric and micro-electro-mechanical systems (MEMS). In the specification, the term sleep mode may generally refer to a low power mode for the mobile device 20 to save significantly on power consumption, in stead of leaving the mobile device 20 fully on all the time. The term sleep mode may include, for example, stand by, sleep, suspend and hibernation.

Figure 2A:
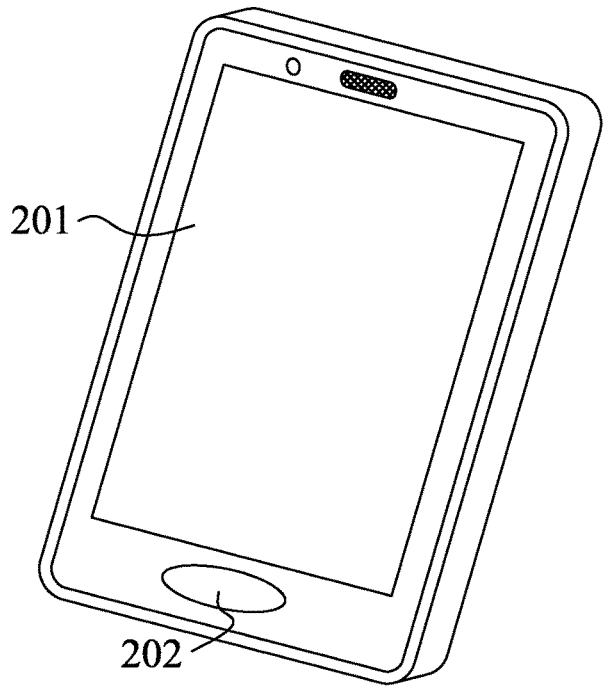
FIG. 2A shows a perspective view exemplifying a mobile device.
Figure 2B:
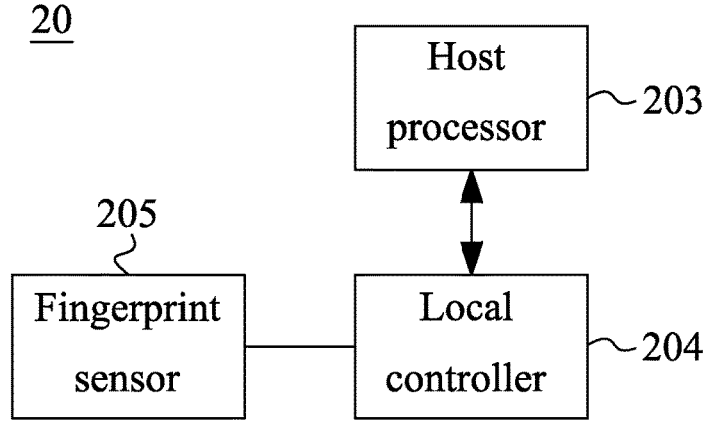
FIG. 2B schematically shows a simplified block diagram illustrating the mobile device of FIG. 2A.

FIG. 2B schematically shows a simplified block diagram illustrating the mobile device 20 of FIG. 2A. Specifically, the mobile device 20 may include a host processor 203 that is configured primarily to operate the components (such as the touch screen 201) of the mobile device 20. The host processor 203 of the embodiment may include, for example, a central processing unit.

The mobile device 20 may also include a local controller 204 that is configured to command the fingerprint sensor 205 associated with and disposed at the scan area 202 to authenticate a fingerprint pattern captured by the fingerprint sensor 205. In the operating mode, the host processor 203 may communicate with the local controller 204. In the sleep mode, the host processor 203 is separate from the local controller 204.

Figure 3A:
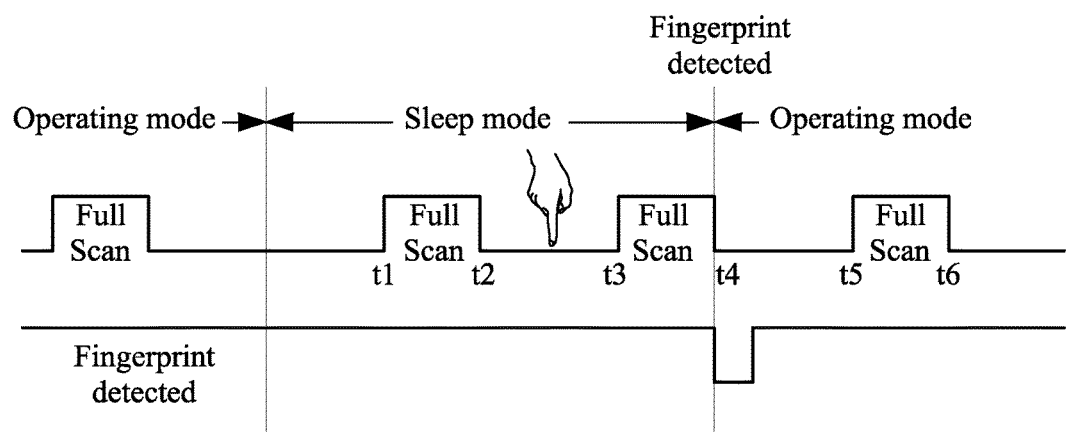
FIG. 3A shows an exemplary timing diagram demonstrating the full scan performed by the fingerprint sensor of FIG. 2B.

In step 11 (FIG. 1), while in the sleep mode, the fingerprint sensor 205 captures an image by scanning a fingerprint pattern. In one embodiment, the fingerprint sensor 205 performs full scan under control of the local controller 204 in a manner that substantial entirety of the fingerprint sensor 205 performs the scan. FIG. 3A shows an exemplary timing diagram demonstrating the full scan performed by the fingerprint sensor 205 of FIG. 2B. Specifically speaking, the fingerprint sensor 205 performs periodic full scans under control of the local controller 204 during, for example, period t1-t2 and period t3-t4. A finger touches the fingerprint sensor 205 at a time between t2 and t3.

Figure 3B:
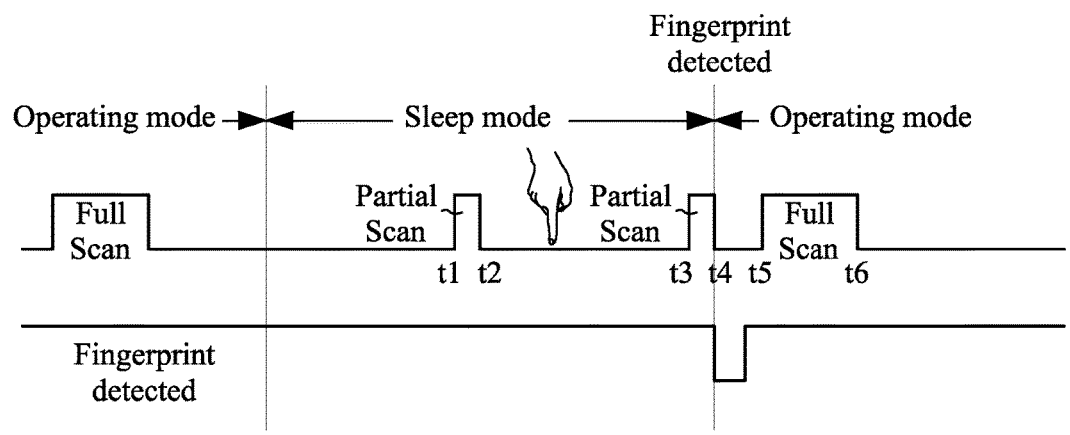
FIG. 3B shows an exemplary timing diagram demonstrating the partial scan performed by the fingerprint sensor of FIG. 2B.

In another embodiment, the fingerprint sensor 205 performs partial scan under control of the local controller 204 in a manner that part of the fingerprint sensor 205 performs the scan. FIG. 3B shows an exemplary timing diagram demonstrating the partial scan performed by the fingerprint sensor 205 of FIG. 2B.

Specifically speaking, the fingerprint sensor 205 performs periodic partial scans under control of the local controller 204 during, for example, period t1-t2 and period t3-t4. Compared with the embodiment performing full scan (FIG. 3A), the embodiment performing partial scan (FIG. 3B) may execute with higher speed and lower power consumption.

Figure 4A:
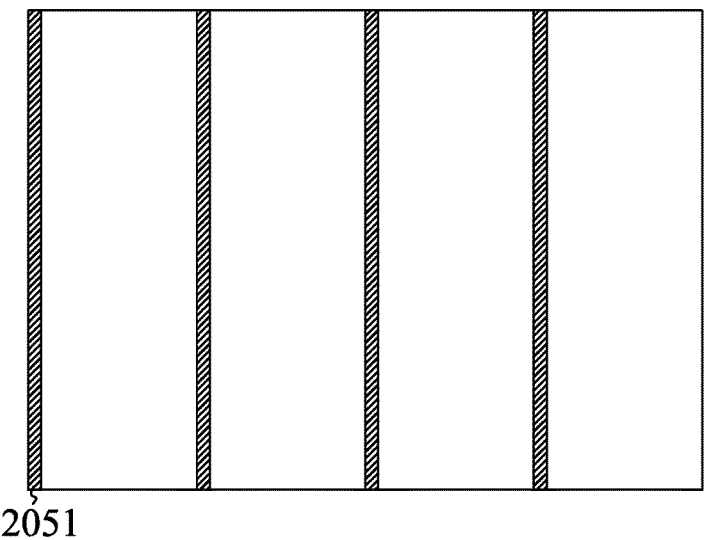
FIG. 4A schematically shows an exemplary fingerprint sensor that performs a partial scan.
Figure 4B:
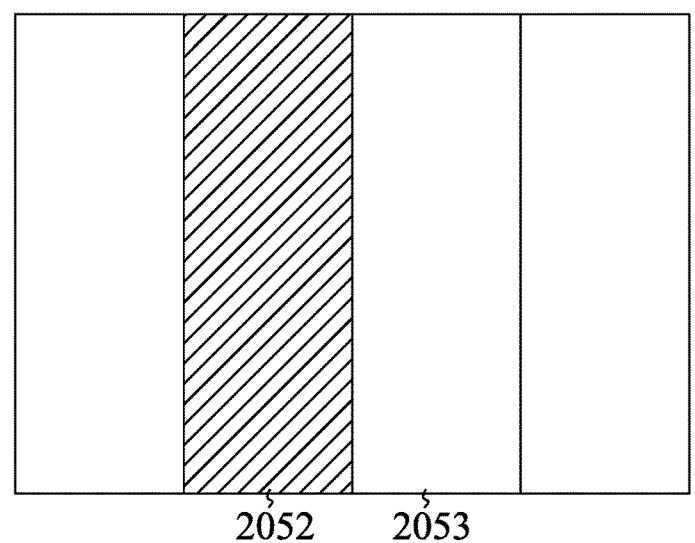
FIG. 4B schematically shows another exemplary fingerprint sensor that performs a partial scan.

FIG. 4A schematically shows an exemplary fingerprint sensor 205 that performs a partial scan. In the exemplary embodiment, one line 2051 out of some successive lines (say 10 lines) is scanned. FIG. 4B schematically shows another exemplary fingerprint sensor 205 that performs a partial scan. In the exemplary embodiment, one block of lines 2052 is scanned, while other blocks of lines 2053 are not scanned.

In step 12, the local controller 204 analyzes the captured image representing the scanned fingerprint pattern. In the embodiment, the captured image is analyzed by a statistical method. Specifically, an amount of pixels in the captured image with respect to each brightness value is obtained.

Figure 5:
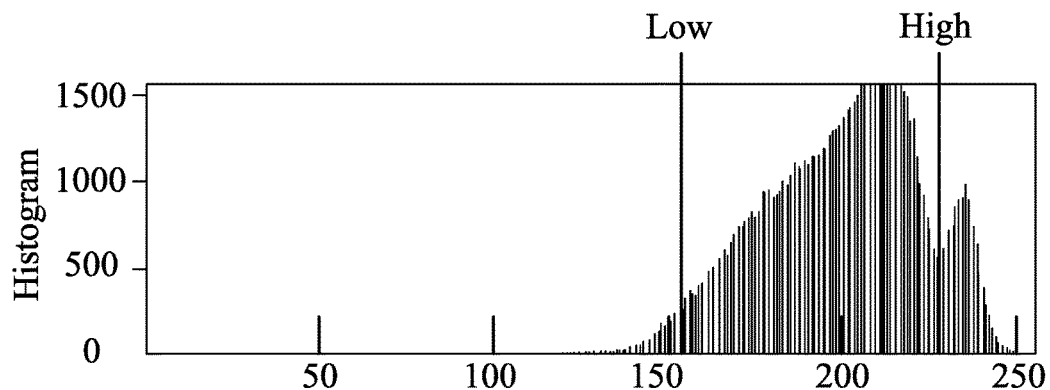
FIG. 5 shows an exemplary image histogram revealing brightness distribution of a fingerprint pattern.

In step 13, analysis results collected from step 12 are then transformed into brightness distribution by the local controller 204. According to one aspect of the embodiment, the analysis results are transformed into an image histogram. As the amount of pixels is represented in vertical axis with respect to each brightness value represented in horizontal axis, an image histogram may then be plotted in a conceptual manner. In an exemplary embodiment, larger brightness value represents brighter pixel. FIG. 5 shows an exemplary image histogram revealing brightness distribution of a fingerprint pattern.

Figure 6:
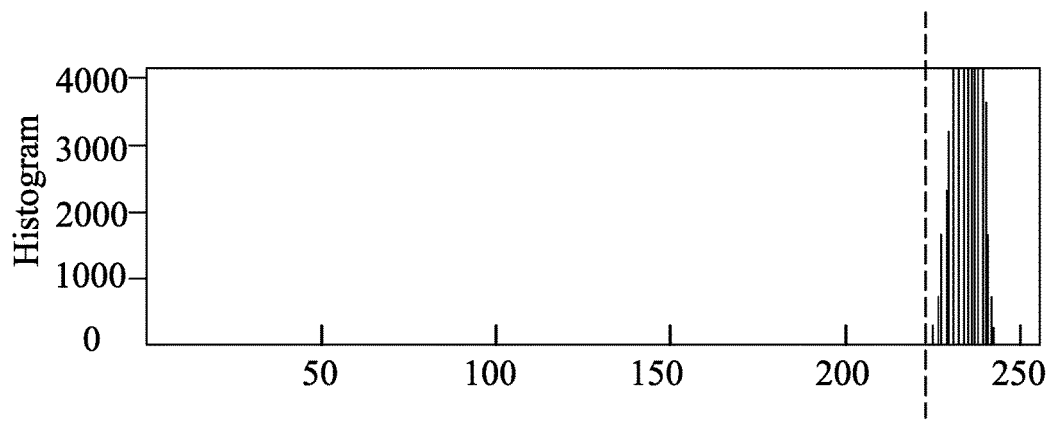
FIG. 6 shows an exemplary image histogram revealing brightness distribution of a null pattern.

A high (or first) thresholding value for the image histogram of the fingerprint pattern need be determined beforehand as exemplified in FIG. 5. In determining the high thresholding value, a background histogram revealing brightness distribution of a null (i.e., without fingerprint) pattern, as exemplified in FIG. 6, need be obtained in advance. As no fingerprint is present, pixels of a captured image mainly reside in a narrow background range of high brightness values. In the embodiment, the left (or lower) boundary value of the background range (FIG. 6) is set as the high thresholding value for the image histogram of the fingerprint pattern (FIG. 5).

Referring to FIG. 5, a low (or second) thresholding value, being less than the high thresholding value, may be further determined for the image histogram of the fingerprint pattern. As the brightness distribution near the left (or lower) portion of the image histogram rises monotonically, the low thresholding value may be set at a brightness value with a correspondingly significant amount (e.g., 250) of pixels. The pixels of the image histogram with brightness values less than the low thresholding value are mainly noise, and should be discarded.

Figure 7:
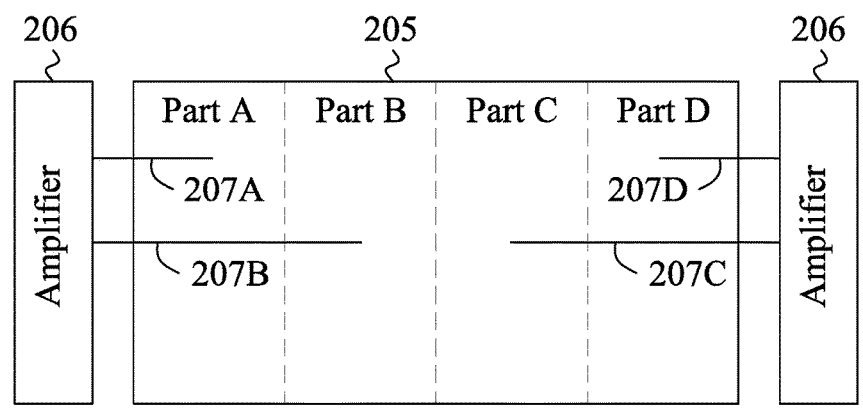
FIG. 7 schematically shows an exemplary fingerprint sensor that is divided into four parts.

It is observed that various parts of the fingerprint sensor 205 have different response due to dissimilar signal attenuation. FIG. 7 schematically shows an exemplary fingerprint sensor 205 that is divided into four parts, e.g., part A, part B, part C and part D. Signals collected from part A are amplified by an amplifier 206 via wires 207A. Similarly, signals collected from part B, part C and part D are amplified by the amplifier 206 via wires 207B, 207C and 207D, respectively. As signals in the (longer) wires 207B and 207C suffer greater attenuation than the signals in the (shorter) wires 207A and 207D, the high thresholding value and the low thresholding value are set different for the part A, part B, part C and part D. For example, the high/low thresholding value of part B/C is set smaller than the high/low thresholding value of part A/D.

Subsequently, in step 14, the amounts of pixels for the brightness values (i.e., histogram data) between the low thresholding value and the high thresholding value are operated (or calculated) by the local controller 204 to result in a feature value. For example, histogram data between the low thresholding value and the high thresholding value are summed up to result in a feature sum. Alternatively, standard deviation or maximum/minimum value may be obtained instead as the feature value.

In step 15, the feature value resulted from step 14 is compared, by the local controller 204, with a previously stored feature value derived according to a fingerprint pattern of a user of the mobile device 20. If the two feature values match, the local controller 204 notifies the host processor 203, which then wakes up the mobile device 20 from the sleep mode to the operating mode (at time t4, FIG. 3A/3B), or otherwise the flow goes back to step 11. According to the embodiment, there is no need of keying password or pushing a button in order to wake up as for the conventional mobile devices.

After entering the operating mode, the fingerprint sensor 205 may perform full scan, for example, in the period t5-t6 as exemplified in FIG. 3A/3B, to capture an image by scanning the fingerprint pattern. The captured image may then be authenticated by the host processor 203 using a conventional technique (e.g., by comparing with a pre-stored fingerprint golden template) that is distinct from the histogram technique discussed above, in order to make sure that the individual operating the mobile device 20 is an admitted user of the mobile device 20.

Although specific embodiments have been illustrated and described, it will be appreciated by those skilled in the art that various modifications may be made without departing from the scope of the present invention, which is intended to be limited solely by the appended claims.

What is claimed is:
1. A method of waking up a device, comprising:
capturing an image by scanning a fingerprint pattern in a sleep mode;
analyzing the captured image representing the scanned fingerprint pattern to obtain an amount of pixels in the captured image with respect to each brightness value;
transforming the analyzed captured image into brightness distribution, wherein the brightness distribution comprises an image histogram of the fingerprint pattern;
operating the brightness distribution to obtain a feature value;

comparing the feature value with a pre-stored value, the device being woken up when the feature value is matched with the pre-stored value; and determining a first thresholding value for the image histogram of the fingerprint pattern, wherein a low boundary value for an image histogram of a null pattern is set as the first thresholding value for the image histogram of the fingerprint pattern, an image associated with the image histogram of said null pattern being captured while no fingerprint is present.

2. The method of claim 1, wherein the fingerprint pattern is scanned by performing a full scan.

3. The method of claim 1, wherein the fingerprint pattern is scanned by performing a partial scan.

4. The method of claim 1, further comprising a step of determining a second thresholding value for the image histogram of the fingerprint pattern, the second thresholding value being less than the first thresholding value.

5. The method of claim 4, wherein the amounts of pixels for the brightness values between the second thresholding value and the first thresholding value are operated to obtain the feature value.

6. The method of claim 5, wherein the feature value comprising a feature sum by summing up the amounts of pixels for the brightness values between the second thresholding value and the first thresholding value.

7. The method of claim 1, further comprising a step of performing a full scan on the fingerprint pattern after the device has been woken up.

8. A device, comprising:
a host processor that controls at least one component of the device;
a fingerprint sensor associated with and disposed at a scan area; and
a local controller that commands the fingerprint sensor, the host processor communicating with the local controller in an operating mode and being separate from the local controller in a sleep mode;
wherein the fingerprint sensor captures an image under control of the local controller by scanning a fingerprint pattern in the sleep mode; the captured image is analyzed to obtain an amount of pixels in the captured image with respect to each brightness value, which is then transformed into brightness distribution by the local controller, from which a feature value is obtained; and the local controller notifies the host processor to wake up when the feature value is matched with a pre-stored value;
wherein the brightness distribution comprises an image histogram of the fingerprint pattern;
wherein the local controller further determines a first thresholding value for the image histogram of the fingerprint pattern; and
wherein a low boundary value for an image histogram of a null pattern is set as the first thresholding value for the image histogram of the fingerprint pattern, an image associated with the image histogram of said null pattern being captured while no fingerprint is present.

9. The device of claim 8, wherein the fingerprint sensor performs full scan under control of the local controller.

10. The device of claim 8, wherein the fingerprint sensor performs partial scan under control of the local controller.

11. The device of claim 8, wherein the local controller further determines a second thresholding value for the image histogram of the fingerprint pattern, the second thresholding value being less than the first thresholding value.

12. The device of claim 11, wherein the local controller operates the amounts of pixels for the brightness values between the second thresholding value and the first thresholding value to obtain the feature value.

13. The device of claim 12, wherein the feature value comprising a feature sum by summing up the amounts of pixels for the brightness values between the second thresholding value and the first thresholding value.

14. The device of claim 8, wherein the host processor further authenticates the fingerprint pattern by further performing a full scan after wake up.

* * * * *